United States Patent
Ishimatsu et al.

(10) Patent No.: US 9,653,975 B2
(45) Date of Patent: May 16, 2017

(54) ROTOR HAVING PERMANENT MAGNET AND METHOD OF MANUFACTURING THE SAME

(71) Applicants: MITSUI HIGH-TEC, INC., Kitakyushu-shi, Fukuoka (JP); HONDA MOTOR CO., LTD., Tokyo (JP)

(72) Inventors: Hisatomo Ishimatsu, Kitakyushu (JP); Manabu Yazaki, Wako (JP); Koichi Ono, Wako (JP)

(73) Assignees: MITSUI HIGH-TEC, INC., Kitakyushu-shi (JP); HONDA MOTOR CO., LTD., Tokyo (JP)

( * ) Notice: Subject to any disclaimer, the term of this patent is extended or adjusted under 35 U.S.C. 154(b) by 54 days.

(21) Appl. No.: 14/474,695

(22) Filed: Sep. 2, 2014

(65) Prior Publication Data
US 2015/0061445 A1 Mar. 5, 2015

(30) Foreign Application Priority Data
Sep. 5, 2013 (JP) .................................. 2013-184182

(51) Int. Cl.
*H02K 21/12* (2006.01)
*H02K 15/03* (2006.01)
*H02K 1/27* (2006.01)

(52) U.S. Cl.
CPC .............. *H02K 15/03* (2013.01); *H02K 1/276* (2013.01); *Y10T 29/49012* (2015.01)

(58) Field of Classification Search
CPC .................................. H02K 1/27; H02K 15/03
USPC ............ 310/156.01, 156.21, 156.23, 156.53
See application file for complete search history.

(56) References Cited

U.S. PATENT DOCUMENTS

2012/0139377 A1 6/2012 Kim

FOREIGN PATENT DOCUMENTS

| JP | 06086488 A | * | 3/1994 |
| JP | 3585814 B2 | | 11/2004 |
| JP | 2006-197693 A | | 7/2006 |
| JP | 2007049787 A | * | 2/2007 |
| JP | 2007-236019 A | | 9/2007 |
| JP | 2010-110049 A | | 5/2010 |

(Continued)

OTHER PUBLICATIONS

Office Action dated Feb. 28, 2017, issued in counterpart Japanese Patent Application No. 2013-184182, with English translation. (8 pages).

*Primary Examiner* — Jose Gonzalez Quinones
(74) *Attorney, Agent, or Firm* — Westerman, Hattori, Daniels & Adrian, LLP (57) ABSTRACT

A rotor having permanent magnets 10 includes: a laminated core body 13 having a shaft hole 12 in the center thereof and magnet insertion holes 15 around the shaft hole 12; permanent magnets 16 disposed in the respective magnet insertion holes 15; and first and second end face plates 18, 19 disposed on one axial end and the other axial end of the laminated core body 13, respectively, the first and second end face plates 18, 19 including first and second through holes 32, 33, respectively. The first and second through holes 32, 33 each overlap a contour of a magnet insertion hole 15 on a radially inner side or a radially outer side in a plan view, and have first and second tapered portions 34, 35 gradually expanding the diameter toward the magnet insertion hole 15, respectively.

3 Claims, 7 Drawing Sheets (56) References Cited

FOREIGN PATENT DOCUMENTS

| JP | 2010110049 A | * | 5/2010 |
|----|--------------|---|--------|
| JP | 2010-158164 A | | 7/2010 |
| JP | 2012-115057 A | | 6/2012 |
| JP | 2012-120422 A | | 6/2012 |
| JP | 2012115057 A | * | 6/2012 |

* cited by examiner

FIG. 7

ROTOR HAVING PERMANENT MAGNET AND METHOD OF MANUFACTURING THE SAME

FIELD OF THE INVENTION

The present invention relates to a rotor having permanent magnets (with a shaft or without a shaft) in which permanent magnets are resin-sealed in magnet insertion holes of a laminated core body formed by laminating a plurality of core pieces and an end face plate is provided on each side of the core body, and to a method of manufacturing a rotor having permanent magnets. The rotor having permanent magnets can be used for both a motor and a generator.

BACKGROUND OF THE INVENTION

Rotors used for rotating electrical machines (including electric motors and generators) include a rotor core formed by laminating thin electromagnetic steel sheets and a shaft inserted into a shaft hole of a rotor core.

Among the rotating electrical machines is a rotor having permanent magnets in which a plurality of permanent magnets (including unmagnetized magnets) are embedded in magnet insertion holes formed in a laminated core body. Such a rotor having permanent magnets is the most suitable for motors, generators, or FA motors of electric cars which perform high-speed rotations.

The rotor having permanent magnets is manufactured by inserting permanent magnets into magnet insertion holes formed in a laminated core body, filling the magnet insertion holes with a thermoset resin or the like and hardening the resin, and thereby fixing the permanent magnets in the magnet insertion holes (Refer to Patent Literature 1).

There is also a proposal to dispose an end face plate formed of a non-magnetic body on each end of a rotor core having permanent magnets (laminated core body) to prevent the permanent magnets from falling out (Refer to Patent Literature 2).

Patent Literature 3 describes that fixation of end face plates and injection of a resin into magnet insertion holes to which permanent magnets are inserted are performed simultaneously. This operation can simplify assembling of the end face plates and the rotor having permanent magnets (permanent magnet-equipped laminated core body) and reduce man hours. Moreover, in Patent Literature 3, a resin filling hole formed in the end face plates (end plates) is larger than a magnet insertion hole formed in the laminated core body, and has an opening area expanded toward the outside.

CITATION LIST

Patent Literature

Patent Literature 1: Publication of Japanese Patent No. 3585814
Patent Literature 2: Japanese Unexamined Patent Application Publication No. 2007-236019
Patent Literature 3: Japanese Unexamined Patent Application Publication No. 2012-115057

SUMMARY OF THE INVENTION

Technical Problem

However, with a structure of the rotor in Patent Literature 3, the permanent magnets disposed in the rotor core cannot be completely fixed, and therefore the permanent magnets in the magnet insertion holes cannot be settled and become influenced by magnetic properties.

Further, since the resin filling hole of the end face plates, in which the resin is to be filled, is formed splayed in a tapered state, when the end face plates receive a force to move the plates in any direction other than the circumferential direction and the direction at insertion of the shaft, the resin fixing the rotor core to the end face plates is susceptible to fracture.

The fractured resin falls out of the end face plates. When the resin falls out of the end face plates of the rotor having permanent magnets assembled as a motor, there is a chance of not being able to function as a motor.

The present invention has been made in view of the above circumstances, and an object thereof is to provide a rotor having permanent magnets in which resin hardly drops off from resin filling holes even when an end face plate disposed on each side of a rotor core is detached, and in which permanent magnets can be easily positioned in magnet insertion holes, and to provide a manufacturing method thereof.

Solution to Problem

To attain this object, a rotor having permanent magnets according to a first aspect of the present invention includes: a laminated core body having a shaft hole and a plurality of magnet insertion holes, the shaft hole receiving a shaft and formed at a center, the plurality of magnet insertion holes being formed around the shaft hole; permanent magnets disposed in the respective magnet insertion holes; first and second end face plates disposed on one axial end and the other axial end of the laminated core body, respectively, the first and second end face plates including first and second through holes communicating with the magnet insertion holes, respectively; and resin filled in the magnet insertion holes and the first and second through holes, wherein the first and second through holes each overlap a contour of a magnet insertion hole on a radially inner side or a radially outer side in a plan view, and have first and second tapered portions gradually expanding the diameter toward the magnet insertion hole, respectively.

A second aspect of the present invention provides that, in the rotor having permanent magnets according to the first aspect of the present invention, the first and second tapered portions are formed on the magnet insertion hole-side of the first and second through holes, and remaining portions of the first and second through holes on the opposite side to the magnet insertion hole-side are straight.

A third aspect of the present invention provides that, in the rotor having permanent magnets according to the first aspect of the present invention, the first and second through holes have the first and second tapered portions on the magnet insertion hole-side, respectively, and third and fourth tapered portions gradually expanding the diameter toward the opposite side to the magnet insertion hole-side, on the opposite side to the magnet insertion hole-side, respectively.

A fourth aspect of the present invention provides that, in the rotor having permanent magnets according to any of the first to third aspects of the present invention, the first through holes are resin filling holes, the second through holes are check holes for checking the resin filled in the magnet insertion holes, and the second through holes have a smaller cross sectional area than the first through holes.

A method of manufacturing a rotor having permanent magnets according to a fifth aspect of the present invention includes: inserting permanent magnets into each of a plurality of magnet insertion holes of a laminated core body, the laminated core body including a shaft hole and the plurality of magnet insertion holes, the shaft hole receiving a shaft and being at a center, the plurality of magnet insertion holes being around the shaft hole; disposing the laminated core body between a resin injecting mold and a receiving mold that are opposed to each other; and injecting resin from the resin injecting mold to fix the permanent magnets in the magnet insertion holes, and the method further includes:

a first step of disposing first and second end face plates having first and second through holes communicating with the magnet insertion holes, respectively, on both axial sides of the laminated core body into which the permanent magnets are inserted, and positioning the first and second end face plates with respect to a carrier tray;

a second step of disposing, between the resin injecting mold and the receiving mold, the carrier tray on which the first end face plate, the laminated core body, and the second end face plate are mounted, and holding the first end face plate, the laminated core body, and the second end face plate between the resin injecting mold and the receiving mold under pressure; and a third step of filling the resin into the magnet insertion holes through the first through holes formed in the first end face plate, and the first through holes each have a tapered portion gradually expanding the diameter toward the magnet insertion hole.

A sixth aspect of the present invention provides that, in the method of manufacturing a rotor having permanent magnets according to the fifth aspect of the present invention, the first and second end face plates are positioned with respect to the carrier tray by using a post provided on the carrier tray.

A seventh aspect of the present invention provides that, in the method of manufacturing a rotor having permanent magnets according to the fifth and sixth aspects of the present invention, the laminated core body is positioned with respect to the carrier tray by using a positioning member disposed outside of the laminated core body and a positioning pin provided outside of the carrier tray.

An eighth aspect of the present invention provides that, in the method of manufacturing a rotor having permanent magnets according to any one of the fifth to seventh aspects of the present invention, the resin injecting mold is located below the laminated core body, the carrier tray disposed between the laminated core body and the resin injecting mold has vertically-penetrating resin delivery holes, and the resin is filled into the magnet insertion holes through the first through holes.

A ninth aspect of the present invention provides that, in the method of manufacturing a rotor having permanent magnets according to any one of the fifth to seventh aspects of the present invention, the resin injecting mold is located above the laminated core body, a dummy plate is disposed between the first end face plate and the resin injecting mold, and the resin is filled into the magnet insertion holes from the first through holes via resin delivery holes of the dummy plate.

A tenth aspect of the present invention provides that, in the method of manufacturing a rotor having permanent magnets according to any one of the fifth to ninth aspects of the present invention, the second through holes are provided to check whether or not the magnet insertion holes are fully filled with the resin, and the second through holes have a smaller diameter than the first through holes.

Advantageous Effects of Invention

In the rotor having permanent magnets according to the first aspect of the present invention, since the first and second through holes each overlap the contour of the magnet insertion hole on the radially inner side or the radially outer side in a plan view, and have the first and second tapered portions gradually expanding the diameter toward the magnet insertion hole, respectively, the amount of resin connecting the end face plates to the laminated core body increases, increasing the force to fix the end face plates to the laminated core body.

Further, since the resin can be injected along the wall faces of the magnet insertion holes, the permanent magnets can be moved to the radially inner side or the radially outer side of the magnet insertion holes.

Furthermore, even when the end face plates are partially separated from the laminated core body, the resin does not fall out of the end face plates.

In the rotor having permanent magnets according to the second aspect of the present invention, since the first and second tapered portions are formed on the magnet insertion hole-side of the first and second through holes, and remaining portions of the first and second through holes on the opposite side to the magnet insertion hole-side are straight, the amount of used resin can be reduced.

In the rotor having permanent magnets according to the third aspect of the present invention, since the first and second through holes have the first and second tapered portions on the magnet insertion hole-side, respectively, and the third and fourth tapered portions gradually expanding the diameter toward the opposite side to the magnet insertion hole-side, on the opposite side to the magnet insertion hole-side, respectively, the coupling between the end face plates and the laminated core body can be improved.

In the rotor having permanent magnets according to the fourth aspect of the present invention, since the first through holes are resin filling holes, the second through holes are check holes for checking the resin filled in the magnet insertion holes, the second through holes have a smaller cross sectional area than the first through holes, the permanent magnets can be reliably moved toward one side of the respective magnet insertion holes by the resin entering through the first through holes to inject the resin thereto. Further, in the second through holes, the volume of the resin fixing the second end face plate to the laminated core body can be reduced.

In the method of manufacturing a rotor having permanent magnets according to the fifth aspect of the present invention, the first through holes each have a tapered portion gradually expanding the diameter toward the magnet insertion hole, even when the end face plate is partially detached from the laminated core body, the resin in the first through holes does not drop off.

In the method of manufacturing a rotor having permanent magnets according to the sixth aspect of the present invention, the first and second end face plates are positioned with respect to the carrier tray by using the post provided on the carrier tray, the first and second end face plates can be easily positioned.

In the method of manufacturing a rotor having permanent magnets according to the seventh aspect of the present invention, since the laminated core body is positioned with respect to the carrier tray by using the positioning member disposed outside of the laminated core body and the positioning pin provided outside of the carrier tray, the laminated core body can be positioned with respect to the carrier tray more correctly.

In the method of manufacturing a rotor having permanent magnets according to the eighth aspect of the present invention, since the resin injecting mold is located below the laminated core body, the carrier tray disposed between the laminated core body and the resin injecting mold has vertically-penetrating resin delivery holes, and the resin is filled into the magnet insertion holes through the first through holes in the state where the permanent magnets are in contact with the first end face plate, the permanent magnets can be reliably moved toward one side of the respective magnet insertion holes. Further, the resin is not excessively formed on the first end face plate, eliminating the need to remove any excessive resin.

In the method of manufacturing a rotor having permanent magnets according to the ninth aspect of the present invention, since the resin injecting mold is located above the laminated core body, the dummy plate is disposed between the first end face plate and the resin injecting mold, and the resin is filled into the magnet insertion holes from the first through holes via resin delivery holes of the dummy plate, the resin is not excessively formed on the first end face plate, eliminating the need to remove any excessive resin. Further, by removing the excessive resin formed in the resin delivery holes of the dummy plate, the dummy plate can be recycled.

In the method of manufacturing a rotor having permanent magnets according to the tenth aspect of the present invention, since the second through holes are provided to check whether or not the magnet insertion holes are fully filled with the resin, and the first through holes have a larger diameter than the second through holes, the first end face plate can be strongly bonded to the laminated core body. The second through holes are provided to merely check the filling state and thus, may be small.

DETAILED DESCRIPTION OF THE INVENTION

For further understanding of the present invention, embodiments of the present invention will be described below.

With reference to FIG. 1 to FIG. 5, a rotor having permanent magnets 10 according to one embodiment of the present invention will be described. A rotor having permanent magnets 10 includes a plurality of core pieces 11, a laminated core body 13 that is formed by laminating the core pieces 11 and has a shaft hole 12 into which a shaft having a circular cross section is inserted at its center, permanent magnets 16 disposed in a plurality of respective magnet insertion holes 15 around the shaft hole 12 in the circumference direction of the laminated core body 13, and first and second end face plates 18 and 19 disposed under the laminated core body 13 (back face, one axial end) and on the laminated core body 13 (front face, the other axial end), respectively.

The first and second end face plates 18 and 19 each are formed of a non-magnetic plate made of aluminum, stainless steel, or the like, which has a thickness of, for example, 2 to 5 mm, have the same outer diameter as the outer diameter of the core pieces 11 or a slightly (0.5 to 3 mm) smaller diameter than the outer diameter of the core pieces 11, and have auxiliary shaft holes 20 and 21, respectively, at their centers.

The auxiliary shaft holes 20 and 21 each have partial cylindrical portions 23 and 24 and opposing linear portions 27 and 28 between the partial cylindrical portions 23 and 24, and the linear portions 27 and 28 act as rotation stops (baffles). An angle a of the linear portions 27 and 28 that form with the centers of the auxiliary shaft holes 20 and 21 (see FIG. 3) is, for example, in the range of 40 to 70 degrees. The curvature radius of the partial cylindrical portions 23 and 24 is the same as or slightly larger than the radius of the shaft hole 12.

Figure 1:
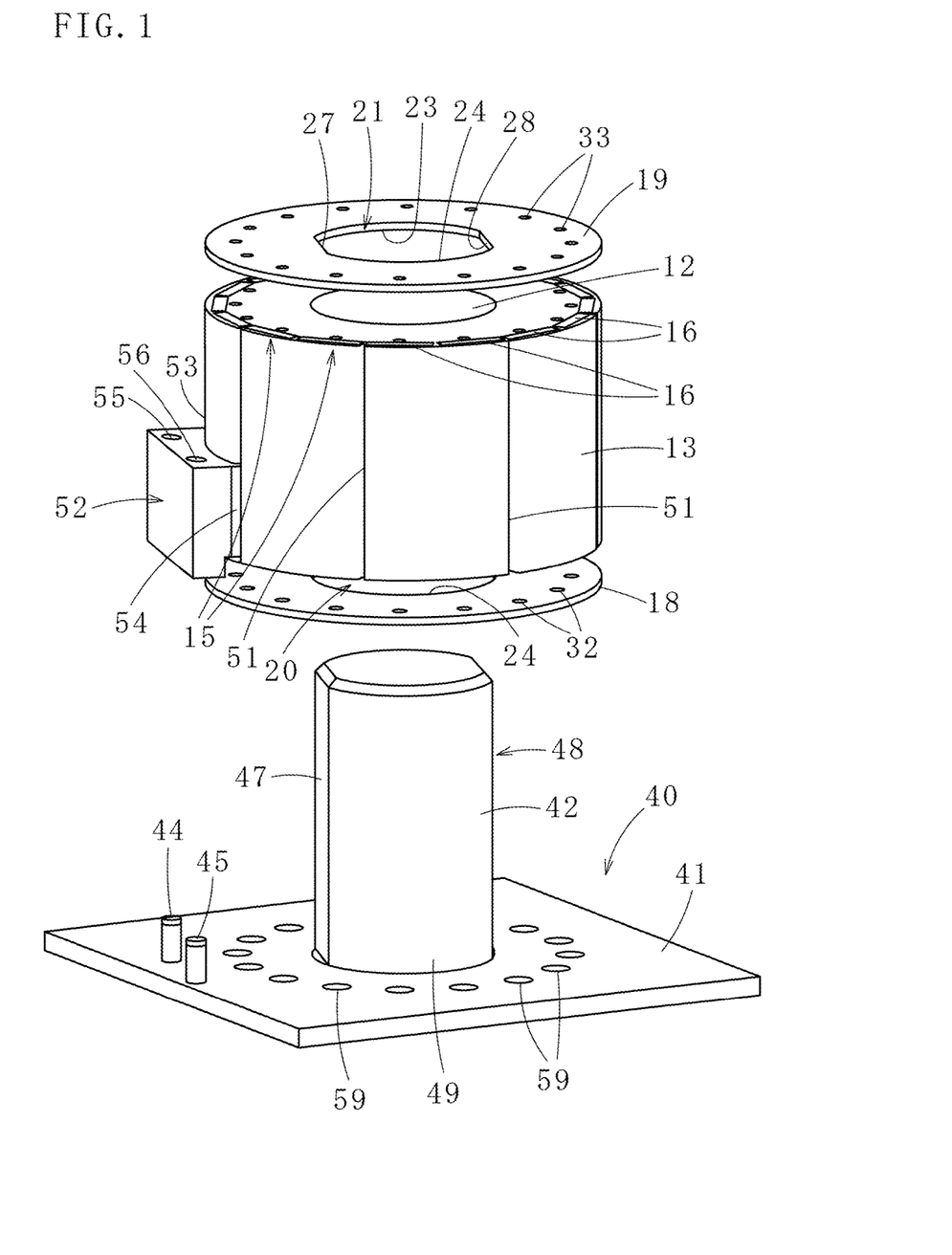
FIG. 1 is an explanatory diagram illustrating an assembled state of a rotor having permanent magnets according to a first embodiment of the present invention.
Figure 2:
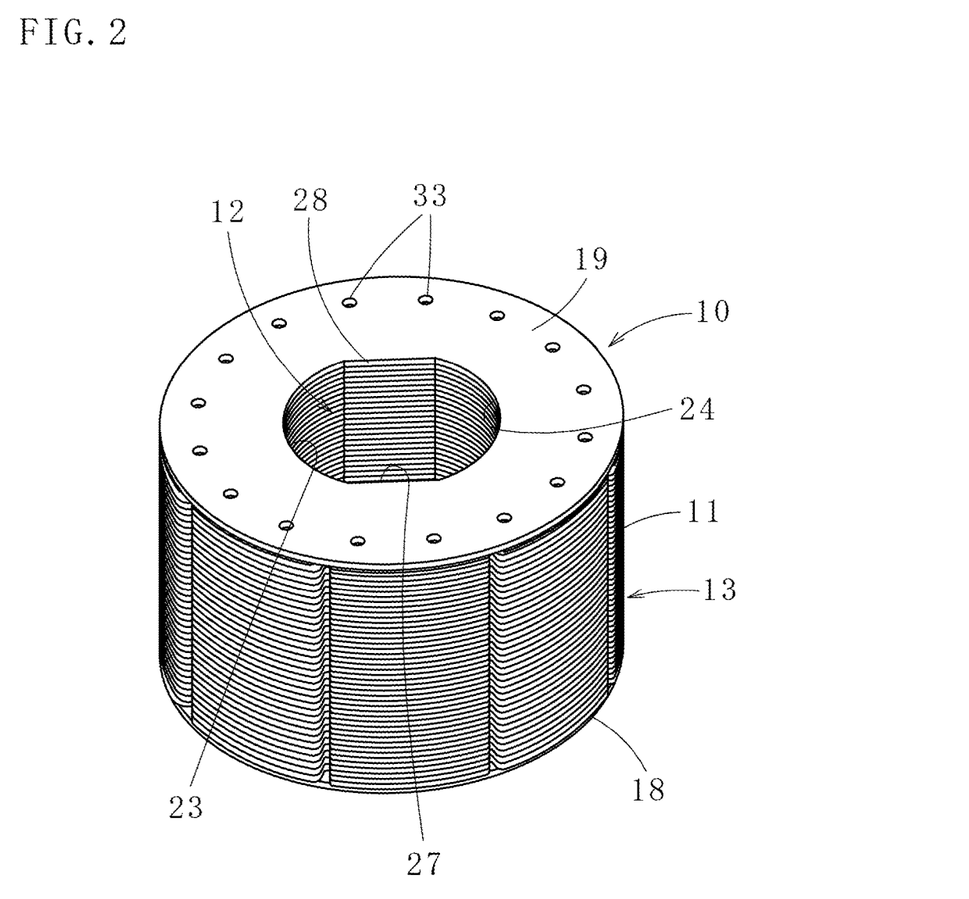
FIG. 2 is a perspective view of the rotor having permanent magnets.
Figure 3:
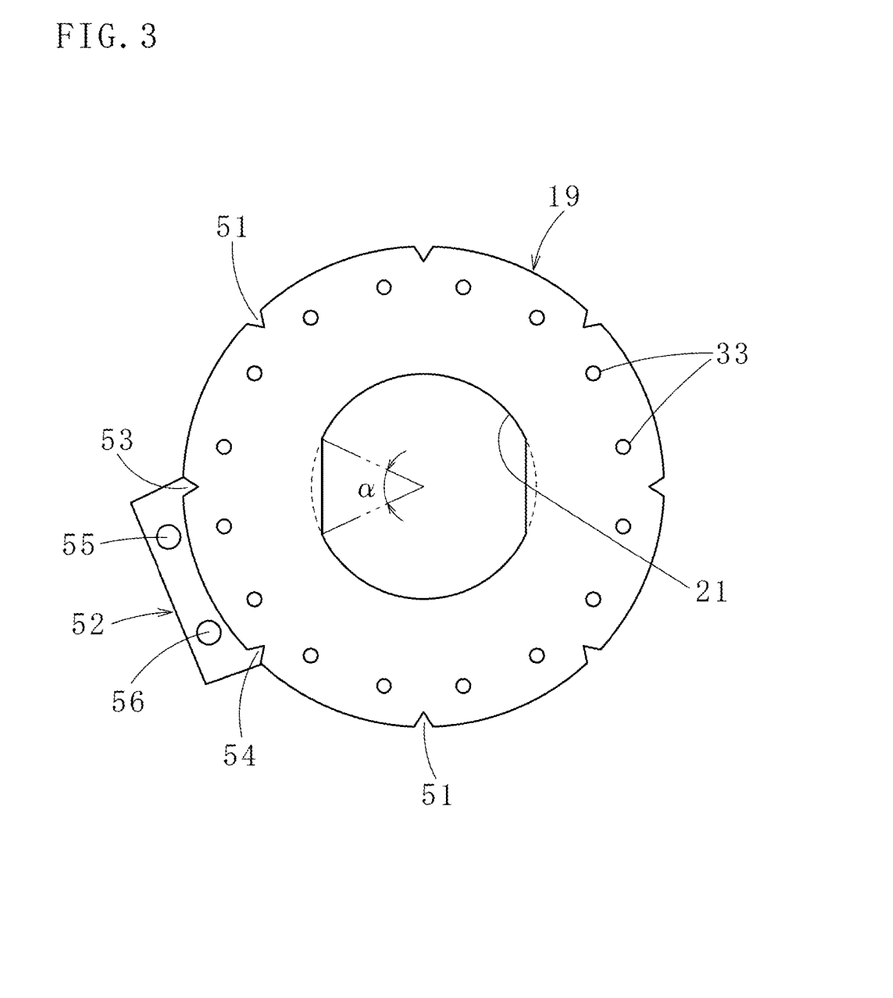
FIG. 3 is a plan view of the rotor having permanent magnets in the assembled state.
Figure 5A:
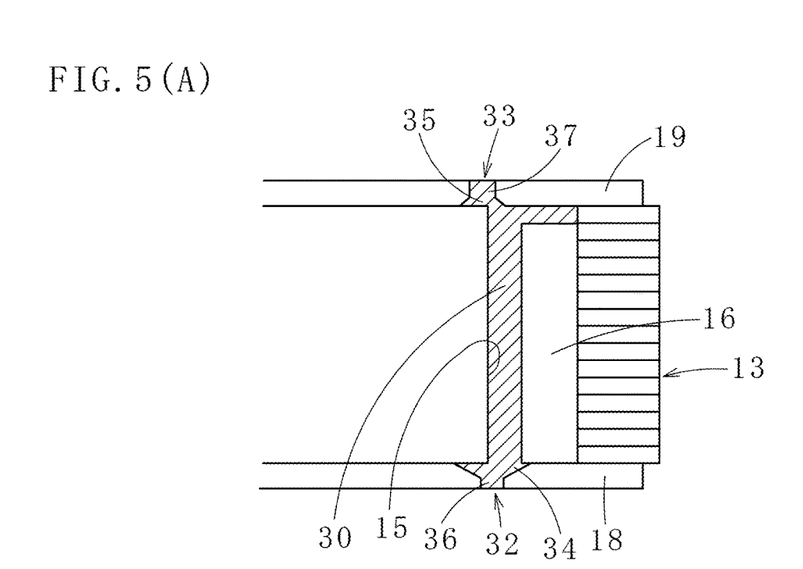
FIGS. 5A, 5B, and 5C each are a partial sectional view of the rotor having permanent magnets according to the first embodiment of the present invention.
Figure 5B:
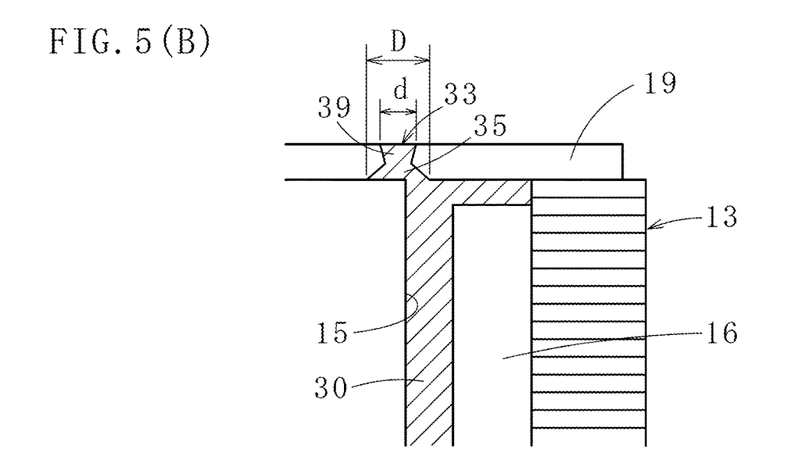

As shown in FIG. 1 and FIGS. 5A and 5B, the first and second end face plates 18 and 19 have a plurality of first and second through holes 32 and 33, respectively, communicating with the magnet insertion holes 15. Each of the first and second through holes 32 and 33 is circular in a plan view. The center of the circle overlaps a flat face (contour in a plan view) of the magnet insertion hole 15 on the radially inner side (or outer side), and when the resin is injected from the first through hole 32, the permanent magnet (unmagnetized) 16 in the magnet insertion hole 15 lean to one side (the radially outer side in this example) of the magnet insertion hole 15.

Figure 5C:
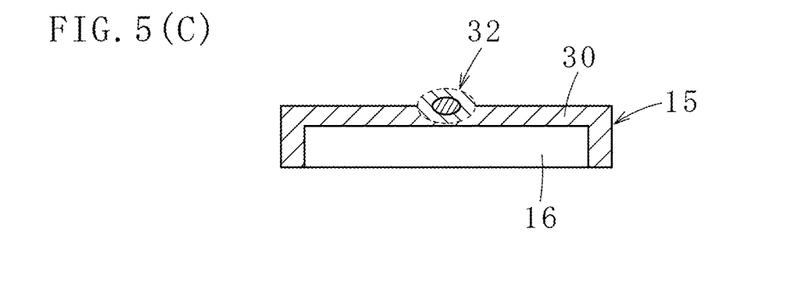

The first and second through holes 32 and 33 are positioned at the center in the longitudinal direction and on one side in the radius direction in the magnet insertion holes 15 (see FIG. 5C). A reference numeral 30 denotes the resin filled into the magnet insertion holes 15 and the first and second through holes 32 and 33.

Each second through hole 33 has a smaller cross sectional area than each first through hole 32 (for example, 0.4 to 0.9 times). The reason for this is that the first through holes 32 are used as resin filling holes and thus, the resin filling position with respect to the magnet insertion holes 15 can be further ensured. The second through holes 33 are made smaller than the first through holes 32 to reduce the amount of the resin. The second through holes 33 serve to check the filling of the resin (that is, they become check holes) and thus, may be small.

The first and second through holes 32 and 33 have first and second tapered portions 34 and 35, respectively, gradually expanding the diameter toward the magnet insertion hole (that is, laminated core body 13) on the magnet insertion hole side. The remaining halves of the first and second through holes 32 and 33 (that is, on the opposite side to the magnet insertion hole) have straight portions 36 and 37. The straight portions 36 and 37 may be replaced with a third tapered portion (not shown) and a fourth tapered portion 39 that gradually expands the diameter toward the opposite side to the magnet insertion hole (see FIG. 5B). A diameter D of the first and second tapered portions 34 and 35 is larger than an outer diameter d of the third tapered portion and the fourth tapered portion 39.

By providing the first and second through holes 32 and 33 with the tapered portions 34 and 35, respectively, even when the first and second end face plates 18 and 19 are detached from the laminated core body 13, advantageously, the resin 30 remaining in the first and second through holes 32 and 33 does not drop off.

Figure 6:
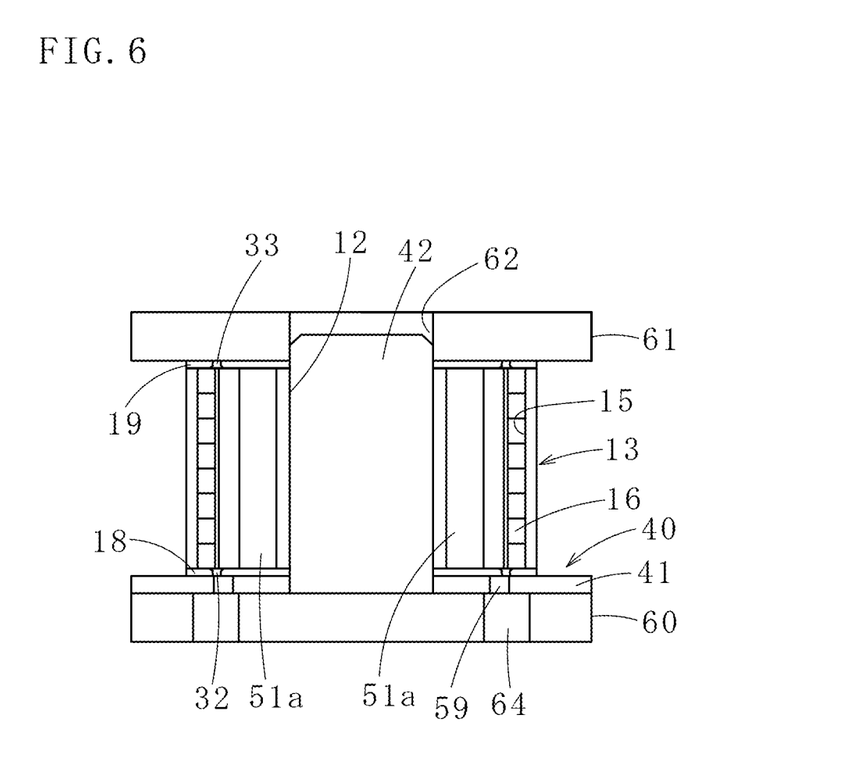
FIG. 6 is a sectional view showing a manufacturing state of the rotor having permanent magnets.

A carrier tray 40 is used to convey the rotor having permanent magnets 10 assembled as shown in FIG. 1 and FIG. 6. The carrier tray 40 has a rectangular carrier table 41 in a plan view, a post 42 placed at the center of the carrier table 41, and two positioning pins 44 and 45 located outside of the mounted laminated core body 13. The post 42 has the same curvature radius as the shaft hole 12 of the laminated core body 13, and a cylindrical portion 49 having planar portions 47 and 48 on its opposed side faces. The cylindrical portion 49 is fitted into the shaft hole 12 of the laminated core body 13 and the auxiliary shaft holes 20 and 21 of the first and second end face plates 18 and 19. The whole length of the post 42 is larger than the height of the laminated core body 13 provided with the first and second end face plates 18 and 19, such that the post 42 is partially fitted into an upper die 61 in this embodiment (see FIG. 6). The post 42 enables positioning of the first and second end face plates 18 and 19 and the carrier tray 40.

Positioning grooves 51 each having a constant angle are formed in the circumferences of the laminated core body 13 and the second end face plate 19, and positioning portions 53 and 54 of a positioning member 52 provided on the outer side are fitted into the positioning groove 51. The positioning member 52 has parallel positioning holes 55 and 56, and the positioning pins 44 and 45 vertically provided on the carrier table 41 are fitted into the positioning holes 55 and 56, respectively, to position the laminated core body 13 with respect to the carrier table 41. The positioning grooves 51 are provided circumferentially at regular intervals to keep the balance of the laminated core body 13. The positioning grooves in the circumference of the second end face plate 19 are omitted in FIG. 1 and FIG. 2.

Figure 4:
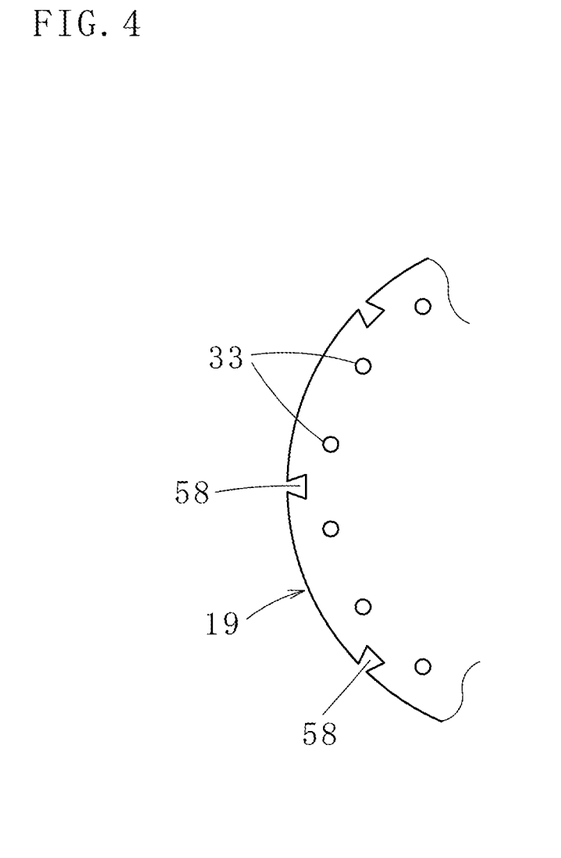
FIG. 4 is a partial plan view showing a variation of positioning grooves of the rotor having permanent magnets.

Although the positioning grooves 51 each are a groove having a triangular cross section in this embodiment, it may be a dovetail groove 58 gradually expanding the width toward the radially inner side as shown in FIG. 4. The dovetail groove can prevent the positioning member from escaping to the radially outer side, thereby positioning the laminated core body 13 more precisely.

Although the positioning member 52 is provided outside of the laminated core body 13 in this embodiment, in the case where the laminated core body 13 has weight-reducing through holes 51a (see FIG. 6), the pins of the carrier table 41 and the positioning member may be fitted into the through holes 51a to position the laminated core body 13 with respect to the carrier tray 40.

In this embodiment, since the resin 30 is injected from below the laminated core body 13, the carrier table 41 has vertically-penetrating resin delivery holes 59 communicating with the respective first through holes 32.

Next, with reference to FIG. 1 and FIG. 6, a method of manufacturing the rotor having permanent magnets, including resin-sealing of the permanent magnets 16 in the magnet insertion holes 15 of the laminated core body 13 will be described.

The core pieces 11 made of a long magnetic strip material are caulked and laminated to form the core pieces 11 having the shaft hole at the center, the magnet insertion holes around the shaft hole, and the positioning grooves on the outermost face.

Then, the post 42 of the carrier tray 40 is inserted into the first end face plate 18, and the laminated core body 13 is placed on the first end face plate 18. Next, the positioning member 52 is attached such that the positioning portions 53 and 54 of the positioning member 52 are fitted into the positioning groove 51 having the predetermined angle, which is provided on the circumference of the laminated core body 13, thereby attaching the positioning pins 44 and 45 into the positioning holes 55 and 56 to install the first end face plate 18 and the laminated core body 13 at predetermined positions of the carrier tray 40.

Next, the permanent magnets 16 are inserted into the respective magnet insertion holes 15. Then, the second end face plate 19 is attached to the post 42, and the first end face plate 18, the laminated core body 13 provided with the permanent magnets 16, and the second end face plate 19 are disposed on the carrier tray 40. In this state, they are set on a die apparatus having a lower die 60 as a resin injecting mold and the upper die 61 as a receiving mold, the lower die 60 and the upper die 61 being opposed to each other.

In this case, since the carrier table 41 of the carrier tray 40 is rectangular, the carrier tray 40 can be disposed at a predetermined position of the lower die 60 by using a guide provided on the lower die 60.

FIG. 6 shows this state. The carrier tray 40 is placed on the lower die 60, the first end face plate 18 and the laminated core body 13 provided with the permanent magnets 16 are mounted on the carrier tray 40, and then the second end face plate 19 is mounted on the laminated core body 13. The top of the post 42 is fitted into a central guide hole 62 of the upper die 61. The lower die 60 and the upper die 61 hold the carrier tray 40, the first end face plate 18, the laminated core body 13, and the second end face plate 19 under pressure. The lower die 60 has resin pots (resin reservoir pots) 64 corresponding to the centers of the first through holes 32 of the first end face plate 18 and the resin delivery holes 59 of the carrier table 41, and the resin 30 in the resin pots 64 is pushed upward by use of a plunger not shown.

After filling the magnet insertion holes 15 with resin 30, the rotor having permanent magnets 10 with the carrier tray 40 can be removed from the die apparatus, and at this time, whether or not the resin 30 is properly filled can be checked through the second through holes 33.

Since the first and second through holes 32 and 33 have the tapered portions 34 and 35 gradually expanding the diameter toward the laminated core body 13, respectively, even when the first and second end face plates 18 and 19 are detached, the resin 30 in the first and second through holes 32 and 33 never drops off. Further, since the first and second end face plates 18 and 19 are coupled to the laminated core body 13 via the resin column having a large cross sectional area, the first and second end face plates 18 and 19 are also hardly detached from the laminated core body 13.

Figure 7:
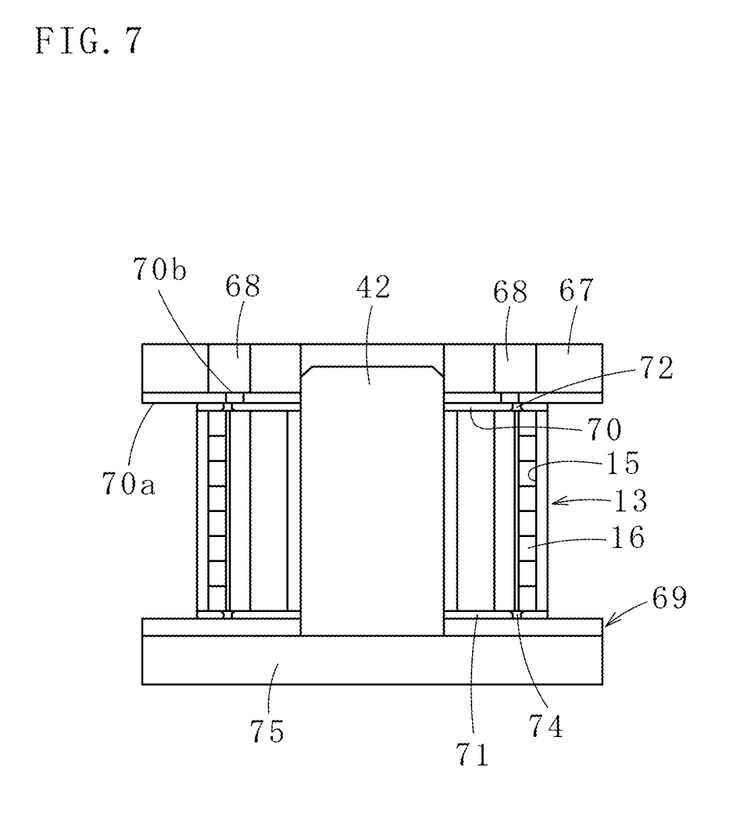
FIG. 7 is an explanatory diagram illustrating a rotor having permanent magnets according to a second embodiment of the present invention.

Subsequently, a method of manufacturing the rotor having permanent magnets according to the second embodiment of the present invention shown in FIG. 7 will be described. According to the method of manufacturing the rotor having permanent magnets, an upper die 67 as a resin injecting mold has resin pots (resin reservoir pots) 68, and a carrier tray 69 has no resin delivery hole. A first end face plate 70 is located above the laminated core body 13 into which the permanent magnets 16 are inserted, and a second end face plate 71 is provided below the laminated core body 13. A dummy plate 70a is provided on the first end face plate 70.

The dummy plate 70a serves to guide resin discharged from the resin pots 68 of the upper die 67 to the first end face plate 70 via resin delivery holes 70b of the dummy plate 70a, and after resin-sealing, the dummy plate 70a is removed from the manufactured rotor having permanent magnets. The structure of the dummy plate 70a is well known in Publication of Japanese Patent No. 4991900 and so on.

The first end face plate 70 has first through holes 72 gradually expanding the diameter toward the laminated core body, and the second end face plate 71 has second through holes 74 gradually expanding the diameter toward the laminated core body. The first and second through holes 72, 74 each have a tapered portion gradually expanding the diameter toward the laminated core body 13. For this reason, resin filled in the first and second end face plates 70, 71 hardly drops off.

The other conditions are the same as the conditions of the method of manufacturing the rotor having permanent magnets according to the first embodiment and thus, description thereof is omitted.

Consequently, according to the method of manufacturing the rotor having permanent magnets in the second embodiment, the second end face plate 71, the laminated core body 13 into which the permanent magnets 16 are inserted, the first end face plate 70, and the dummy plate 70a, which are mounted on the carrier tray 69, are disposed at a predetermined position between a lower die 75 as a receiving mold and the upper die 67. In the pressed state between the lower die 75 and the upper die 67, resin is injected through the resin pots 68. The action and effect in this case are the same as those in the method of manufacturing the rotor having permanent magnets in the first embodiment.

In the above embodiments, the laminated core body is previously heated, or is heated to a predetermined temperature at mounting to the lower die. After resin-sealing, the positioning member is removed from the laminated core body.

The resin is preferably a thermoset resin, but may be a thermoplastic resin.

The present invention is not limited to the above embodiments, may be modified or changed without departing from the scope of the present invention, and part of the above embodiments may be used in other embodiments as well.

A shaft which is an end product may be used as a post.

REFERENCE SIGNS LIST

10: rotor having permanent magnets, 11: core piece, 12: shaft hole, 13: laminated core body, 15: magnet insertion hole, 16: permanent magnet, 18: first end face plate, 19: second end face plate, 20, 21: auxiliary shaft hole, 23, 24: partial cylindrical portion, 27, 28: linear portion, 30: resin, 32: first through hole, 33: second through hole, 34: first tapered portion, 35: second tapered portion, 36, 37: straight portion, 39: fourth tapered portion, 40: carrier tray, 41: carrier table, 42: post, 44, 45: positioning pin, 47, 48: planar portion, 49: cylindrical portion, 51: positioning groove, 51a: through hole, 52: positioning member, 53, 54: positioning portion, 55, 56: positioning hole, 58: dovetail groove, 59: resin delivery holes, 60: lower die, 61: upper die, 62: central guide hole, 64: resin pot, 67: upper die, 68: resin pot, 69: carrier tray, 70: first end face plate, 70a: dummy plate, 70b: resin delivery holes, 71: second end face plate, 72: first through hole, 74: second through hole, 75: lower die

The invention claimed is:

1. A rotor having permanent magnets, comprising:
a laminated core body including a shaft hole and a plurality of magnet insertion holes, the shaft hole receiving a shaft and being provided at a center, the plurality of magnet insertion holes being provided around the shaft hole;
permanent magnets disposed in the respective magnet insertion holes;
first and second end face plates disposed on one axial end and the other axial end of the laminated core body, respectively, the first and second end face plates including first and second through holes communicating with the magnet insertion holes, respectively; and
resin filled in the magnet insertion holes and the first and second through holes,
wherein the first and second through holes each overlap a contour of a magnet insertion hole on a radially inner side or a radially outer side in a plan view, and have first and second tapered portions gradually expanding the diameter toward the magnet insertion hole, respectively, and
wherein the first and second through holes have the first and second tapered portions on the magnet insertion hole-side, respectively, and have third and fourth tapered portions gradually expanding the diameter toward the opposite side to the magnet insertion hole-side, on the opposite side to the magnet insertion hole-side, respectively.

2. The rotor having permanent magnets according to claim 1, wherein
the first through holes are resin filling holes, the second through holes are check holes for checking the resin filled in the magnet insertion holes, and the second through holes have a smaller cross sectional area than the first through holes.

3. A rotor having permanent magnets, comprising:
a laminated core body including a shaft hole and a plurality of magnet insertion holes, the shaft hole receiving a shaft and being provided at a center, the plurality of magnet insertion holes being provided around the shaft hole;
permanent magnets disposed in the respective magnet insertion holes;
first and second end face plates disposed on one axial end and the other axial end of the laminated core body, respectively, the first and second end face plates including first and second through holes communicating with the magnet insertion holes, respectively; and
resin filled in the magnet insertion holes and the first and second through holes,
wherein the first and second through holes each overlap a contour of a magnet insertion hole on a radially inner side or a radially outer side in a plan view, and have first and second tapered portions gradually expanding the diameter toward the magnet insertion hole, respectively,
wherein the first and second tapered portions are formed on the magnet insertion hole-side of the first and second through holes, and remaining portions of the first and second through holes on the opposite side to the magnet insertion hole-side are straight, and
wherein the first through holes are resin filling holes, the second through holes are check holes for checking the resin filled in the magnet insertion holes, and the second through holes have a smaller cross sectional area than the first through holes.

* * * * *